OR  4,025,162

United States
Yagi

[11] 4,025,162
[45] May 24, 1977

[54] LIQUID CRYSTAL DISPLAY DEVICE

[75] Inventor: Kenjiro Yagi, Tokyo, Japan

[73] Assignee: Kabushiki Kaisha Daini Seikosha, Japan

[22] Filed: Aug. 6, 1975

[21] Appl. No.: 602,445

[30] Foreign Application Priority Data
Aug. 9, 1974  Japan .............................. 49-90735
Aug. 9, 1974  Japan .............................. 49-90736

[52] U.S. Cl. ...................... 350/160 LC; 339/17 M
[51] Int. Cl.² ........................................ G02F 1/13
[58] Field of Search ........ 350/160 LC; 339/17 LM, 339/17 M; 317/101 CP; 58/50 R; 340/336

[56] References Cited
UNITED STATES PATENTS

| | | | |
|---|---|---|---|
| 3,805,117 | 4/1974 | Hausman | 317/101 CP |
| 3,853,392 | 12/1974 | Fergason | 350/160 LC |
| 3,863,436 | 2/1975 | Schwarzschild et al. | 58/50 R |

*Primary Examiner*—John K. Corbin
*Assistant Examiner*—Rolf Hille
*Attorney, Agent, or Firm*—Robert E. Burns; Emmanuel J. Lobato; Bruce L. Adams

[57] ABSTRACT

A liquid crystal display device comprises a liquid crystal cell comprised of a pair of transparent plates having sandwiched therebetween liquid crystal material and an electrode on one face of one transparent plate. Drive circuitry, in the form of either integrated circuitry or a printed circuit board, is superposed beneath the liquid crystal cell such that the drive circuitry electrode is electrically insulated from the liquid crystal cell electrode. A set of electrically conductive and mechanically resilient gripping members, having a generally C-shape, grip together the liquid crystal cell and the drive circuitry thereby both mechanically and electrically connecting them together without need of any additional connecting parts.

10 Claims, 6 Drawing Figures

U.S. Patent  May 24, 1977  4,025,162
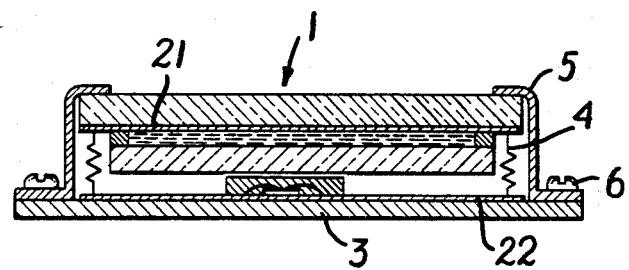
FIG. 1
PRIOR ART
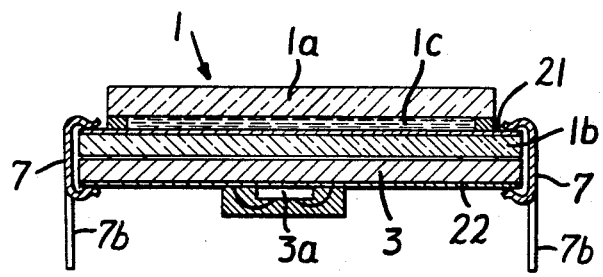
FIG. 2
FIG. 3      FIG. 4
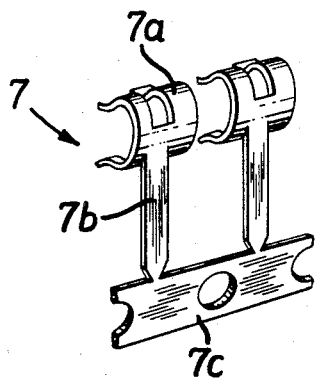
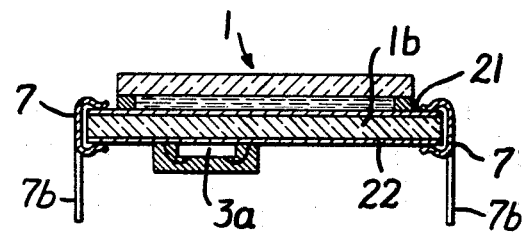
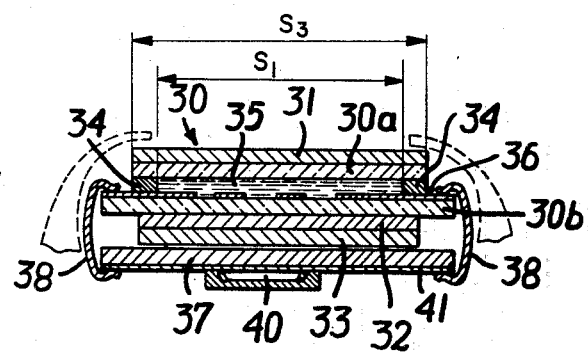
FIG. 5
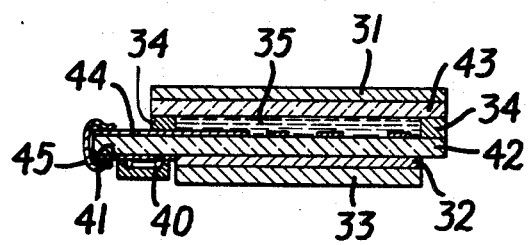
FIG. 6

LIQUID CRYSTAL DISPLAY DEVICE

BACKGROUND OF THE INVENTION

This invention relates to a liquid crystal display device having a liquid crystal cell and a printed circuit board for driving the liquid crystal cell, and especially relates to an improved mechanical and electrical connection between the liquid crystal cell and circuit board.

In the conventional type display device, the liquid crystal cell and the drive cricuit are constructed so as to enable easy attaching and detaching in view of the construction and maintenance which must be performed.

In FIG. 1 is shown a typical prior art construction wherein the outer electrode 21 of the liquid crystal cell 1 and the electrode of the printed cricuit board 3 are oppositely positioned to each other.

Said liquid crystal cell and said printed circuit board are supported by a supporting member 5 and electro-conductive elastic material 4, and are elastically supported by a screw bolt 6.

According to the aforementioned technique, the electrical connection between said printed circuit board and said liquid crystal cell is attained by the electro-conductive elastic member 4, whereas the mechanical connection between said printed circuit board and said liquid crystal cell is attained by the supporting member 5 and the screw bolt 6. Therefore, a relatively large number of parts are needed thereby increasing the cost of the liquid crystal cell. Moreover, the uppermost portion of the liquid crystal cell 1 is supported by the supporting member 5 so that an air gap exists between said liquid cell 1 and the outer protective glass, whereby the aforementioned construction is not suitable for use in a thin type of a display device.

OBJECT OF THE INVENTION

The present invention aims to eliminate the above noted difficulty and insufficiency, and therefore it is the primary object of the present invention to provide a display device which simultaneously attains the electrical and mechanical connection between the liquid crystal cell and the printed circuit board using a minimal number of parts.

Further object of the present invention is to provide a liquid crystal cell having a grip member as the supporting means of the liquid crystal cell and the printed circuit board.

A further object of the invention is to provide a thin type liquid crystal device.

SUMMARY OF THE INVENTION

According to the present invention, there is provided a liquid crystal display device comprising: a liquid crystal cell composed of two transparent plates housing there-beween liquid crystal material, a printed circuit board containing a drive circuit for driving the liquid crystal cell, and a plurality of C- gripping members. The liquid crystal cell and said printed cricuit board are electrically and mechanically connected solely by the gripping members.

BRIEF DESCRIPTION OF THE DRAWINGS

The above mentioned and further objects, features and advantages of the present invention will become more obvious from the following description when taken in connection with the accompanying drawings, which show one preferred embodiment and another preferred embodiment of the invention, and wherein:

FIG. 1 shows a cross sectional view of a prior art type liquid crystal display device having conventional electrical and mechanical connection.

FIG. 2 shows a cross sectional view of one embodiment of the liquid crystal display device of the present invention.

FIG. 3 shows a perspective view of the electro-conductive gripping member of the present invention.

FIG. 4 shows a cross sectional view of another embodiment.

FIG. 5 shows a cross sectional view of the liquid crystal display device having C-shaped gripping member of the present invention.

FIG. 6 shows a cross sectional view of a further embodiment of the present invention.

DETAILED DESCRIPTION OF THE INVENTION

This invention relates to a liquid crystal display device having a "C"-shaped gripping member for mounting and connecting together a liquid crystal cell and a printed circuit board as one integral unit. Referring now to one embodiment of the pesent invention, FIG. 2 shows a liquid crystal cell 1 composed of an upper glass 1a, a lower glass 1b and a liquid crystal material 1c which is housed between said upper and lower glasses, and a cell electrode 21 for the display is coated on the inner side of the lower glass 1b.

A drive circuit is composed of a printed circuit board 3 or a logic IC 3a on said printed circuit board, and an input and output electrode or terminal 22 opositely positioned with respect to said cell electrode 21.

The drive circuit is superposed beneath the liquid crystal cell as shown in the drawing.

An electro-conductive gripping member 7 which has a generally C-shape in cross-sectional grippingly engages said cell electrode 21 and said input and output terminal 22 due to its elasticity, and sandwiches together and interconnects said liquid crystal cell 1 and said printed circuit board 3.

FIG. 3 shows one exmple of the electro-conductive gripping member 7 in the embodiment in FIG. 2.

Said electro-conductive gripping member 7 is made of a pressformation of a metallic spring material such as phospher bronze plate, and is constructed as one body with a C-shaped gripping portion 7a, a supporting portion 7b and a connecting plate 7c which is cut away and discarded after assembling.

FIG. 4 shows another embodiment of the present invention, the input and output terminal or electrode 22 and the logic IC 3a are positioned on the back face of the lower glass 1b of the constructing material of said liquid crystal cell 1, and the cell electrode 21 and said input and output terminal 22 are electrically connected by said electro-conductive gripping member 7.

According to the aforementioned construction, said liquid crystal cell and said drive circuit are simultaneously electrically and mechanically connected by said electro-conductive gripping member.

The connecting plate 7c of said electro-conductive gripping member is kept in place until the gripping member is attached to the display device, and then it is removed, however a part portion of the supporting portion 7b in FIG. 2 is connected to each other by the insulating material in order to maintain the mechanical connection of the respective gripping members.

The supply of electric power and drive signals to said drive circuit is attained by connecting the supporting portion 7b of said electro-conductive gripping member to another electric circuit (not indicated).

According to the present invention, the electrical and mechanical, connection between the liquid crystal cell and the drive circuit is attained using a reduced number of parts as compared to prior art constructions. A reliable electrical connection and easy attachment and detachment are achieved whereby the display device may be easily constructed and maintained.

Referring now to another embodiment of the present invention, in FIG. 5 a liquid crystal display device 30 is composed of a first transparent supporting plate 30a, a second transparent supporting plate 30b which is larger than the first plate 30a, a first polarizing plate 31 which is disposed at the front of said first transparent supporting plate, a second polarizing plate 32 which is disposed at the back face of said second transparent plate 30b and which has a polarizing direction crossing with respect to said first polarizing plate 31, a reflecting plate 33 for increasing the display effect, and a spacer 34 for sealing a liquid crystal material 35.

An outer lead electrode 36 which is made of tin oxide is coated on the inner face of the second transparent supporting plate 30b.

The electrical and mechanical connection between the liquid crystal display device 30 and the driving or printed circuit board 37 having a driving circuit is attained by the C-shaped gripping member 38 as indicated in FIG. 5.

Further, FIG. 6 shows another embodiment of the present invention comprising a driving circuit 40 and input and output terminals 41 disposed on the back face of the second transparent supporting plate 42 which is larger than the first transparent supporting plate 43.

The electrode 41 is disposed on the back face of the plate 42. The electrical connection between electrodes 44 and 41 are attained by the C-shaped gripping member 45.

In the aforementioned last two embodiments, it is preferable that said first polarizing plate 31, second polarizing plate 32 and said reflecting plate 33 be larger than the dimensions of the liquid crystal material 35 as this enables the driving circuit 40 and power cell (not indicated) to be housed in the cavity defined by the polarizing plate 32 and reflecting plate 33.

According to the present invention, the following features exist:

1. It enables a reduction in the ratio of the front face dimension $S_3$ of the display device to the effective display dimension $S_1$. See FIG. 5.

2. As a result, of 1 above, it enables greater latitude for the free design of the outer casing.

3. It enables a reduction in the number of parts needed for the mechanical and electrical connection using the C-shaped gripping member by coating the outer electrode to the inner face of the second transparent supporting plate.

4. It enables the display device to be made thin by mounting the liquid crystal cell to the back face of the driving circuit and the second transparent supporting plate or inner face.

Consequently there is provided a thin display device using a liquid crystal and having a broader display face.

Furthermore, it enables the design of a wide range of effective display dimensions.

What we claim is:

1. A liquid crystal display device comprising: a liquid crystal cell comprised of first and second superposed and spaced apart transparent plates, an electrode on the one face of said second transparent plate which faces said first transparent plate, and liquid crystal material sandwiched between said transparent plates; drive circuitry superposed beneath the other face of said second transparent plate for driving said liquid crystal cell, said drive circuitry including an electrode which is electrically insulated from the liquid crystal cell electrode; and a set of electrically conductive and mechanically resilient gripping members resiliently gripping together said liquid crystal cell and drive circuitry to thereby mechanically connect them together and engaging with both said liquid crystal cell electrode and the drive circiutry electrode to thereby electrically connect said electrodes together.

2. A liquid crystal display device according to claim 1; wherein each gripping member has a generally C-shape gripping portion grippingly engaging said liquid crystal cell electrode and said drive circuitry electrode.

3. A liquid crystal display device according to claim 1; wherein said drive circuitry electrode is disposed on the said other face of said second transparent plate.

4. A liquid crystal display device according to claim 3; wherein said drive circuitry is connected to said drive circuitry electrode on the side thereof opposite that which is disposed on said second transparent plate.

5. A liquid crystal display device according to claim 1; wherein said drive circuitry comprises a printed circuit board superposed on the said other face of said second transparent plate.

6. A liquid crystal display device according to claim 1; wherein said drive circuitry comprises an integrated circuit connected to said drive circuit electrode.

7. A liquid crystal display device according to claim 1; further including a reflecting plate disposed beneath said second transparent plate.

8. A liquid crystal display device according to claim 7; further including a polarizing plate interposed between said second transparent plate and said reflecting plate.

9. A liquid crystal display device according to claim 8; wherein said polarizing and reflecting plates have a smaller length of extent than said second transparent plate thereby defining a cavity beneath said second transparent plate and the side edges of said polarizing and reflecting plates, said drive circuitry being housed within said cavity.

10. A liquid crystal display device according to claim 1; wherein said set of gripping members comprises the sole means electrically and mechanically connecting together said liquid crystal cell and said drive circuitry.

* * * * *